(12) United States Patent
Diener et al.

(10) Patent No.: US 8,519,093 B2
(45) Date of Patent: Aug. 27, 2013

(54) PROCESS AND A DEVICE FOR THE CONTINUOUS TREATMENT OF MIXED SUBSTANCES

(75) Inventors: Andreas Diener, Triebischtal (DE); Pierre-Alain Fleury, Ramlingsburg (CH); Thomas Isenschmid, Magden (CH); Alfred Kunz, Muttenz (CH); Alain Schwick, Allschwil (CH); Manuel Steiner, Basel (CH); Daniel Witte, Grenzach-Wyhlen (DE)

(73) Assignee: List Holding AG, Arisdorf (CH)

( * ) Notice: Subject to any disclaimer, the term of this patent is extended or adjusted under 35 U.S.C. 154(b) by 0 days.

(21) Appl. No.: 13/148,133

(22) PCT Filed: Feb. 5, 2010

(86) PCT No.: PCT/EP2010/000735
§ 371 (c)(1),
(2), (4) Date: Aug. 5, 2011

(87) PCT Pub. No.: WO2010/089137
PCT Pub. Date: Aug. 12, 2010

(65) Prior Publication Data
US 2011/0294978 A1 Dec. 1, 2011

(30) Foreign Application Priority Data

| Feb. 5, 2009 | (DE) | 10 2009 007 621 |
| Feb. 5, 2009 | (DE) | 10 2009 007 640 |
| Feb. 5, 2009 | (DE) | 10 2009 007 641 |
| Feb. 5, 2009 | (DE) | 10 2009 007 642 |
| Feb. 5, 2009 | (DE) | 10 2009 007 643 |
| Feb. 5, 2009 | (DE) | 10 2009 007 644 |

(51) Int. Cl.
*C08G 64/00* (2006.01)
*C08G 63/02* (2006.01)

(52) U.S. Cl.
USPC .......................... 528/501; 528/480; 528/503

(58) Field of Classification Search
USPC .................................. 528/480, 503
See application file for complete search history.

(56) References Cited

U.S. PATENT DOCUMENTS

| 3,683,511 A | 8/1972 | Johnson et al. |
| 3,880,407 A | 4/1975 | List |
| 4,198,265 A | 4/1980 | Johnson |
| 4,898,897 A | 2/1990 | Kiyohara et al. |
| 4,909,898 A | 3/1990 | Padliya et al. |
| 5,478,509 A | 12/1995 | King et al. |
| 5,684,087 A | 11/1997 | Wulff et al. |
| 5,948,905 A | 9/1999 | Connor et al. |
| 6,039,469 A | 3/2000 | Palmer |
| 6,150,498 A | 11/2000 | Abel, Jr. et al. |
| 6,506,447 B1 | 1/2003 | Hirsch et al. |
| 6,875,756 B1 | 4/2005 | Michels et al. |
| 7,060,788 B2 | 6/2006 | Hucks et al. |
| 7,858,716 B2 * | 12/2010 | Kobayashi et al. ........ 526/125.3 |
| 2004/0094862 A1 | 5/2004 | Sturm et al. |
| 2005/0024987 A1 | 2/2005 | Kunz et al. |
| 2009/0192631 A9 | 7/2009 | Fleury et al. |

FOREIGN PATENT DOCUMENTS

| DE | 2349106 C | 5/1974 |
| DE | 4037028 A1 | 5/1992 |
| DE | 19537113 C1 | 3/1997 |
| DE | 10050295 A1 | 4/2002 |
| DE | 10150900 C1 | 4/2003 |
| DE | 102005001802 A1 | 4/2006 |
| EP | 0262594 B1 | 4/1988 |
| EP | 0267531 A2 | 5/1988 |
| EP | 0288315 A2 | 10/1988 |
| EP | 0517068 A1 | 12/1992 |
| EP | 0552609 A1 | 7/1993 |
| EP | 0575104 A1 | 12/1993 |
| EP | 0853491 | 7/1998 |
| EP | 1077091 A2 | 2/2001 |
| EP | 1127609 A2 | 8/2001 |
| EP | 0910588 B1 | 2/2002 |
| WO | 9630410 A1 | 10/1996 |
| WO | 0220885 A1 | 3/2002 |
| WO | 03/035235 | 5/2003 |
| WO | 2005054308 A1 | 6/2005 |

OTHER PUBLICATIONS

Official action dated Feb. 13, 2012 for DE 10 2009 007 641.7.

* cited by examiner

*Primary Examiner* — Terressa Boykin
(74) *Attorney, Agent, or Firm* — Bachman & LaPointe, P.C.

(57) ABSTRACT

A process for the continuous thermal treatment of mixed substances, especially of solutions, suspensions and emulsions, wherein the continuous treatment of the mixed substances is divided into a main vaporization and a degassing stage, in which instance the main vaporization and the degassing take place in each case takes place in a separate mixer-kneader.

50 Claims, 1 Drawing Sheet

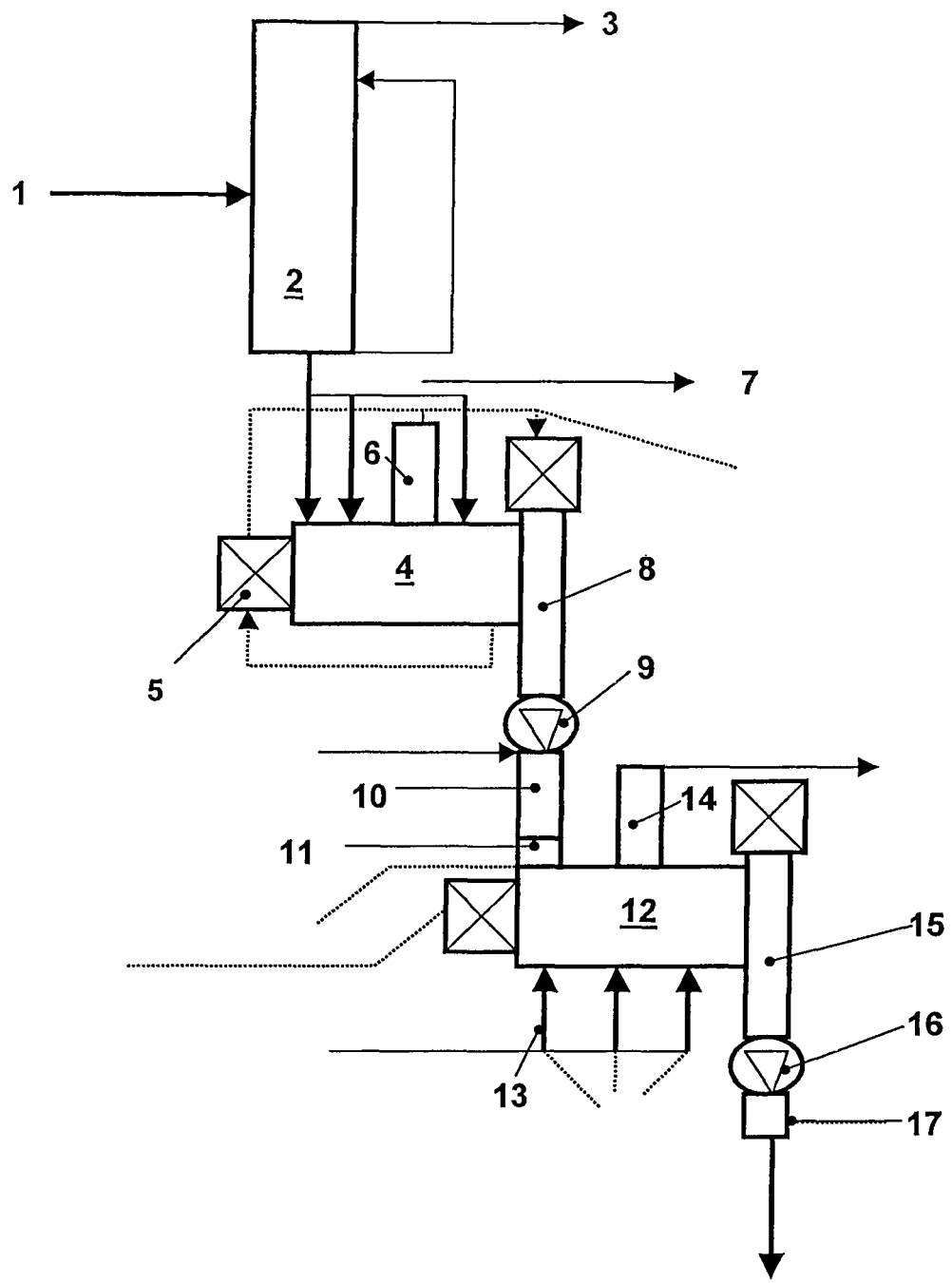

PROCESS AND A DEVICE FOR THE CONTINUOUS TREATMENT OF MIXED SUBSTANCES

BACKGROUND OF THE INVENTION

The invention pertains to a process for the continuous thermal separation of mixed substances, especially of solutions, suspensions and emulsions.

The industrial production of mixed substances, especially, however by no means exclusively, of polymers, especially homo- and co-elastomers, occurs due to polymerization reactions in the so-called solution-polymerization process, in which process the viscosity inside the mixer boiler reactor is lowered through the use of solvents, in order to achieve a more even mixture. From the polymer solution formed in this process, the solvent needs to be separated. The removal of this diluent has until now been achieved by the coagulation-stripping process, in which instance large amounts of energy are required, in the form of Stripping vapor (wet process) Subsequently to this process step, the polymer needs to be separated from the stripping medium in a costly process of mechano-thermal drying. The removal of the stripping medium occurs in two phases by mechanical pressing out and atmospherical drying. During these processes, a great deal of energy in the form of water vapor and a great deal of cleaning water is required, leading to great volumes of waste water and, due to the large open aggregates, to high emissions. In parallel to said process, the stripping agent and the solvent need to be separated from each other, in yet another costly process. Consequently, the current procedure is very inefficient from an energy viewpoint, and a very ineffective technology characterized by high costs for emissions and investment. The existing technology is familiar, the risks are low and catalyst systems and the processing are adapted to this technology.

In the patent document U.S. Pat. No. 3,683,511, a method is described, which was especially developed for the degassing of polymer solutions containing polybutadiene and solutions in which more than 50% of butadiene is polymerized into the polymer. In accordance with the invention, the removal of the solvent is achieved by adding water into the extruder.

Similar problem solutions are also presented in U.S. Pat. No. 4,909,898 A and EP 0 262 594 B1. In these publications the polymer solution is brought into the mixer/kneader zone and the solvent is vaporized at the temperature at which the top surface of the heat transfer surface has a temperature higher than the boiling temperature of the solvent with the lowest boiling point. Also in this instance, a liquid which does not mix with the polymers is added, in this case water.

In U.S. Pat. No. 6,150,498 A and EP 0 910 588 B1, a process for degassing EPDM and similar polymers, such as polyethylene, polypropylene, ethylene-propylene rubber and polystyrol, with a thermal dryer is presented. In this instance, the thermal dryer consists of a horizontal jacket and a rotating shaft inside the jacket, plate elements which are positioned on the shaft, and stationary counter tangs tap positioned on the inner side of the jacket. The implementation of such a technology is confined to polymer solutions which are able to absorb larger amounts of dissipation energy, since the polymer would otherwise get too warm or the degassing performance would be insufficient.

Apart from the energy view point and the high emissions, especially the high costs, for water separation for the modern water sensitive anionic polymerization procedures and the treatment of extremely temperature sensitive products, are a driving force leading to the modernization of the procedure.

It is the objective of the invention to reduce the consumption of energy, i.e. water vapor, and of water, thus improving the energy balance of the process while enhancing the efficiency of new procedures. As a side effect, temperature sensitive mixed substances can be produced, as is not possible in the current technology, or rather only by adding special antioxidants. The new treatment procedure (dry process) is aimed at making the process more energy efficient, more environment friendly and more flexible.

SUMMARY OF THE INVENTION

The solution foregoing object is achieved by providing a process wherein the continuous treatment of the mixed substances is divided into a main vaporization and a degassing process, wherein the main vaporization and the degassing take place each take place in a separate mixer-kneader.

Concerned are, especially and preferably, a process and a device for the continuous treatment of a polymer solution by direct vaporization of the solvent, the monomer, rest products of catalysts, initiators and of reactions, stemming from the polymerization of elastomer containing polymer solutions in mixer-kneaders with one or two mixing shafts. In this instance, a low viscosity polymer solution is treated firstly in an evaporating cycle, secondly in an evaporating mixer-kneader, thirdly in a degassing kneader. This procedure is especially suitable for temperature sensitive polymers, which can only be treated under temperatures up to a maximum of 160° C. However, we hereby make explicit mention of the fact that the process in accordance with the invention pertains to the likewise treatment of other mixed substances, whether these be solutions, suspensions of emulsions. All pertaining mixed substances are to be included in the scope of the herein presented invention.

Preferably, a thin bodied mixed substance is at first preconcentrated in an evaporating cycle with contact heat and then batched in an evaporating mixer-kneader in such a manner that the viscosity in the resulting aggregate is sufficient to provide the greater proportion of evaporating energy via friction, thus vaporizing over 90% of the added fluid (e.g. the solvent). The input of thermal and mechanic energy is thus directly employed in vaporizing the solvent, while the level of pressure is set in such a manner that the maximum temperature of the mixed substance is not exceeded due to the cooling effect of the vaporizing process.

Out of this evaporation kneader a mixed substance with approximately 10% residual humidity (e.g. solvent) is extracted and batched into a degassing kneader, there to vaporize said mixed substance down to the finally desired residual humidity (e.g. residual concentration of solvent).

To improve the degassing process, small amounts of a fluid are batched into the degassing kneader, which fluid by evaporating on the surface of the mixed substance detracts the mechanical energy added for a surface renewal, thus enabling an exact setting of the temperature in the mixed substance, e.g. in order to avoid overheating and thermal damage.

In parallel, the forming fluid vapor (e.g. water vapor) in the exhaust vapors chamber as a stripping agent helps to lower the partial pressure and can, in contrast to the contaminated hot drying air (hot air) of the currently known process, be completely condensated together with the solvent.

The process newly discovered and herein revealed is especially suitable for elastomer containing and plastmer containing homo-polymer solutions, for mixed polymer solutions or for copolymer solutions from solution polymerization, especially for highly temperature sensitive, but also for less sensitive mixed substances, such as, to take an example, for the direct vaporization of butadiene and butyl-derivative elastomers, such as BR, SBR, SBS, SIS, SBM HBR, NBR or also EPDM-derivative elastomers as well as for the vaporization of copolymer solutions which are directly copolymerized mixed from two polymer solutions prior to the direct vaporization, such as polymer solutions of mixed SBS and SBR solutions, i.e. elastomers and polymers which are difficult to mix, and also for polysoprene- or polyethylenepropylene solutions or halobutyl-rubber.

The polymer solutions in question may be polymer solutions mixed in any arbitrary ratio subsequently to the solvent polymerization. At least one polymer solution in question is an elastomer containing polymer.

The volatile components which need separating are solvents or solvent systems, also not converted monomers, residues of catalysts, initiators, stabilizers, antioxidants, polymerization residues.

Due to the closed system of the dry process, approximately 98% of the solvent in the cycle may be regained and the emissions of solvents or the amount of contaminated waste water and gas emissions can be substantially reduced.

Contrary to the above mentioned state of the art, the invention makes it possible to degas elastomer containing polymer solutions, specifically pure polybutadiene solutions, directly and without further supporting units, down to any desirable content of residual solvents, due to the employment of extruders or kneading machines.

The mixer-kneaders, with which the herein presented invention has been tested, possess one or two shafts, rotate in the same or in the opposite direction, and are described in detail in the patents DE 2 349 106 C, EP 0 517 068 A1, EP 0 853 491, DE 101 50 900 C1 (PCT/EP 02/11578; WO 03/035235A1). They are manufactured in sizes up to 25000 liters free volume and can be employed in direct vaporization. They should preferably be voluminous, self cleaning, horizontal mixer-kneaders with one or more shafts, which, one the side of the casing (preferably with double jacket) and/or on the side of the kneader shaft be brought to the correct temperature (independently from each other).

The subordinate claims describe advantageous designs of the procedure in accordance with the invention.

Preferably, a pre-condensing of the mixed substance takes place prior to the main vaporization. Thus, a watery mixed substance with a substance content of 5-50%, for example, can, by a thermal treatment, preferably, but not obligatorily, in a vaporization pipe cycle, be condensed up to a more condensed mixed substance of 20-80%, which can be pumped.

This more highly condensed mixed substance is batched into a vaporizer-kneader inserted posterior to the pre-condensing, for the main vaporization and is vaporized down to a residual content of volatile components of less than 20%, preferably down to 2 to 12%. Batching in is done at one or several places and preferably simultaneously. The batching amount of the mixed substance is in each case controlled by one temperature.

Due to the distribution of the condensed mixed substance in the vaporizer-kneader, a homogenous, highly viscose mixed substance forms into which large amounts of mechanic dissipation energy can be brought by friction. Additionally, due to the distribution of the highly condensed mixed substance in the vaporizer-kneader, the formation of foam is suppressed and a very high specific contact heat per square unit of heating surface is achieved.

The vaporized volatile components, called exhaust vapors, are extracted from the vaporizer-kneader via a exhaust vapor dome. They settle in the vapor dome. The condensable components condense almost completely in a condensator connected via a vapor pipe, which condensator should preferably be a spray condensator or an air conditioned condensator, whereupon the vapors led out of the closed system. The non-condensable components are led to further technical treatment. Also the degassing kneader describe below possesses a similar exhaust vapor discharge.

If so desired, the technical path of the vapors can be, at least partially, lined with an anti-adhesive covered material, in order to prevent a sticking or adhering of mixed substance. Additionally, the technical path of the vapors can be, at least partially, cooled, in order to prevent a re-condensing, thus keeping the vapor path clean. Additionally, or solely, the technical path of the vapors can be kept clean with a nozzle and pulsating, and/or alternatively, stationary cleaning.

A process pressure inside the vaporizer-kneader is chosen such that the cooling by evaporating of the volatile components prevents damage to the mixed substance by overheating, and preferably lies between 10 and 2000 mbar abs. Neither should the heating temperature of the vaporizer-kneader and at any point in time during the process reach or exceed the damage causing temperature and preferably be set to a value between 60° C. and 160° C. In this instance the heating temperature of the vaporizer-kneader should reach or exceed the damage causing temperature of the product only under controlled circumstances.

The vaporization of volatile components in the vaporizer-kneader is preferably controlled via the number of revolutions of the kneader shaft in dependence to the exit temperature. At a constant number of revolutions of the kneader shafts, the amount of mixed substance batched into the vaporizer-kneader is adapted to the respective vaporization rate and thus controlled in dependence to the product temperature. An increase of flow due to the increase of the number of kneader shaft revolutions and consequently increased dissipation energy influx resulting in higher vaporization rate, is felt in a higher temperature and for this reason, flow is increased due to a connection between temperature and batching amount and, likewise in the opposite case of a reduction of the revolution number a reduction of flow.

The mixed substance extracted from the vaporizer-kneader shall be brought to a pressure of more than 1 bar by an accumulation of pressure, preferably by a gear wheel pump. Additionally, the balance of mass in the mixer-kneader shall be kept constant through the number of revolutions of the cog wheel pump, i.e. the output of the kneader and the level of the mass flow shall be separated, in which instance the cog wheel pump is responsible for the constant level of the mass balance. Additionally, the output, preferably integrated directly into the mixer-kneader, shall accumulate enough pressure to give the cog wheel pump sufficient pre-pressure fill it nearly evenly, according to this connection is regulated, albeit it need not definitely be regulated.

Into the pressurized mixed substance is preferably batched a liquid of gaseous additive. This occurs in a mixing pipe or in a static or dynamic mixer and as homogeneously as possible.

In this instance the liquid additive preferably has a freely chosen temperature, preferably between 10° C. and 160° C., and is preferably water, alcohol or a liquefied gas, preferably carbon dioxide or butane.

A gaseous additive also has a freely chosen temperature, preferably between 10° C. and 160° C., and is preferably carbon dioxide, nitrogen or air.

The mixed substance, which is pressurized and, if required, homogeneously mixed with additives, for degassing gets relieved through a nozzle plate in a degassing kneader, which is inserted downstream, in which instance a sudden vaporization of the volatile components and the additives leads to an increase in particle surface, in analogy to the popcorn effect. The nozzle's shape, the positioning of the nozzle, the number of holes and the spacing of the holes in the nozzle plate are adapted to an optimum to the shortening of the diffusion path, the possibility of free gas removal and the increase in diffusion period.

The mixed substance in the degassing kneader is preferably subjected to a stopper flow and a constantly active surface renewal, in which instance mechanical dissipation energy is absorbed into the mixed substance.

During the degassing in the degassing kneader, the temperature of the mixed substance is held below the temperature which could cause damage to the mixed substance, in which instance the temperature is controlled by adding easily vaporized or gaseous additives, which do not dissolve in the mixed substance, at one or several places in the degassing kneader. The additives added to the degassing kneader are, for example, water, alcohols or gases.

By adding easily vaporized additives in the degassing kneader, the temperature of the mixed substance is limited by cooling due to evaporation as well. The limiting of a rise in the temperature in the mixed substance through a mechanical influx of dissipation energy aimed at surface renewal is controlled by temperature measuring instruments and the accordingly batched amount of additives for evaporation cooling is regulated.

The hold up in the degassing kneader is regulated via the exited mass, whereby the mechanical influx of dissipation energy and the evaporation cooling just offset each other and prevent overheating of the mixed substance.

Due to the vaporization of the easily vaporized or gaseous additives, the partial pressure in the gaseous phase of the volatile components to be removed from the mixed substance is substantially reduced, thus causing a stripping effect which speeds up the diffusion.

In total, the content of volatile components in the mixed substance in the degassing kneader is lowered to lie beneath the desired residual contents of 0 to 10000 ppm, preferably 10 to 1000 ppm, even more preferably 10 to 300 ppm.

The volatile components of the mixed substance shall, preferably by adding small amounts of additives which are batched in over the length of the mixer-kneader/s, be separated almost completely. In this instance the amount of extra substances (additives) is set to such a level that the energy balance, in which dissipated kneading energy, contact heating, or contact cooling by shaft and casing of the mixer-kneader/s and the evaporation cooling of the added substance and other volatile components are considered, results in a temperature that guarantees an efficient removal of undesirable volatile components from a pasty mixed substance.

The mixing in of the added substance also favors the formation of microorganisms and micro-bubbles in the mixed substance, which receive the undesirable volatile components and transport them, for example by a rotating shaft to the surface of the mixed substance, thus substantially enhancing the rate of degassing of undesired volatile components. Simultaneously, the pressure in a gas chamber of the kneader can be periodically varied, thus further favoring the creation of micro-bubbles in the melt and thus further increasing the degassing rate.

The adding of small amounts of additives does not chemically alter the mixed substance, neither do damages due to the implementation technique, nor an alteration of characteristics of the mixed substance, occur.

The added extra substances can be distributed evenly over the mixed substance over its length or to point, respectively can be batched in over the length of the mixer-kneader.

In total, the adding of the additives results in more favorable product behavior, especially with respect to surfaces, viscosity etc.

The process pressure is chosen at such a level that the evaporation cooling of the volatile components and of the added vaporizable additives prevent damage to the mixed substance due to overheating. The range lies between 1 and 10000, preferably between 10 and 2000 mbar abs. The heating temperature of the mixer-kneader and the maximal temperature of the mixed substance will at no point in time during the process reach or exceed the damage causing temperature and be set at between −100° to 300°, preferably at between 60° C. and 160° C. The period during which the mixed substance remains in the vaporizer-kneader and the degassing kneader shall be as short as possible, preferably from 5 min to maximally 2 hrs for each apparatus. The vaporizer-kneader and the degassing kneader possess a free volume of 2 liters to 25000 liters.

The mixed substance condensed in the degassing kneader is continuously exited via an output exit, while the mixed substance which is exited from the degassing kneader and freed of volatile components, now referred to as mass, by further build up of pressure, preferably by a cog wheel pump, is brought to a pressure of more than 1 bar.

Subsequently the mass is, through a nozzle plate with a cutting device inserted upstream, preferably a granulator, brought into a form which is suitable for the further processing of the mass. Preferably, but not definitely, said mass is led to a bale press.

The technical positioning of the elements relevant to the process, the confirmation of the mixer-kneader and the process parameters are chosen such that a formation of foam is avoided and, if undesired foam does form, can be reduced by suitable means, respectively destroyed/eliminated.

In all technical phases, sufficient limiting surfaces for an optimal substance transformation inside the mixed substance, respectively inside the mass, and a transcending of the volatile components to the gaseous phase are created.

The high torques, high revolution numbers and the high performances rates for the dissipation energy to be incorporated in the vaporizing phases occurs via a special drive design, according to which a frequency controlled electromotor uses a very large hydraulic motor as oil amount provider, as a pump as it were, and this large amount of oil is directly led to the hydraulic motor of the mixer-kneaders, without any additional resetting of mass flow adjustment.

The supply level in the mixer-kneader is regulated in dependence on the torque of the mixer kneader via the exit mass amount, i.e. the revolution number of the output exit unit or via the input mass amount, i.e. a reduction or an increase of the added amount of mixed substance. A higher revolution number in the mixer-kneader, preferably in the degassing kneader, leads to a higher surface renewal, which speeds up the substance transformation and increases the input of dissipation energy, for which reason the temperature of the mass increases and the accordingly added amount of additive for the evaporation cooling rises, in order not to overheat the elastomer, respectively not to damage it, while simultaneously the partial pressure of the additive in the gas chamber is raised, so that the partial pressure of the components needing removal is reduced, whereby on the other hand a higher driving force for the substance transfer is achieved and the degassing effect of the undesirable components is reduced.

Additionally, protection is requested for a process for the continuous treatment of polymer solutions in a vaporizer and/or a degasser with an uninterrupted produce- and gas chamber, in which instance at least one additive for the regulation of the product's temperature is added as a batched input, so that the temperature always remains below a value at which the temperature would cause damage to the polymer. The input preferably occurs at several places, that is, the product is enriched with additive at several places in the produce- and gas chamber. For an additive, the use of water is preferred.

Via the output exit unit a supply level is preferably thus set that an efficient surface renewal takes place for degassing in the vaporizer and/or the degasser. In this instance, to determine the supply level, the torque of the vaporizer and/or the degasser is used. Additionally, via the choice of the revolution number, the surface renewal, and consequently the residual content of solvent, can be set. Additionally, at the output exit of the mixer-kneader, a helix-shaped output exit unit with one shaft or several shafts and, downstream, a cog wheel pump can be positioned. In this instance, the revolution number of the helix-shaped output exit unit shall be set at such a value that a predetermined pressure occurs at the input of the cog wheel pump, so that the cog wheel pump is nearly completely filled with produce.

Furthermore, the possibility is given that a certain supply level, respectively the torque of the mixer element, is set by varying the revolution number of—preferably—the cog wheel pump, but also of the helix-shaped output exit unit.

The revolution number of the cog wheel pump is then preferably set at such a value that a predetermined pressure at the input of the cog wheel pump occurs, so that the cog wheel pump is nearly completely filled with produce. Simultaneously, the revolution number of the mixer element can be set at such a value that the supply level, respectively the torque can be held constant.

The helix-shaped output exit unit is preferably driven at such a revolution number that the product exiting from the mixer-kneader is ejected right away without causing back pressure.

The additive is batched and added under such process conditions that it vaporizes, thus causing a cooling effect that sets the product temperature and employing the additive as a hauling gas and to lower the partial pressure. The hauling gas is then led opposite to the direction of the produce flow. Also the velocity of the vapors (hauling gas and vaporized solvent) is influenced via the cross section diameter of the vapor dome in such a manner that no produce enters the vapor path.

In continuous vaporizer-dryers the solution needing condensing is usually added at one place and is, gravimetrically or with suitable means transported over a heated surface, where it boils under the preset pressure, thus removing the solvent. The continuous process handling ideally corresponds to that of a flow pipe, since the vaporization rate depends on the difference between the boiling point and the heating surface's temperature (the driving differential) and on the heat exchange coefficient. With a rising content of solid matter, the boiling point rises, consequently the driving differential decreases.

In conventional drying processes, the heat exchange coefficient decreases with an increasing content of solid matter, because viscosity increases with increasing content of solid matter and the heat exchange coefficient decreases with increasing viscosity due to an impaired convection. When solvent is removed from solutions or suspensions of solid matter, especially polymer solutions or suspensions, especially elastomer solutions or suspensions, by vaporizing the solvent, boiling behavior is often reversed. The heat exchange coefficient decreases with an increasing content of solid matter when a critical content of solid matter is exceeded, because the product foams vehemently, the foam dampens the heat exchange surface, thus impairing the heat exchange. In highly diluted solutions, the convective transport of the bubbles to the gas surface is not impaired. The content of solid matter impairs this transport of bubbles. Also, the bubbles become more stable when they occur as foam. It is therefore necessary to destroy the bubbles mechanically.

This occurs automatically at contents of solid matter of more than 30 to 80%, where there is a sufficient amount of condensed solid matter solutions (high hold up). In this case the solution of solid matter is so viscose that it transports the boiling bubbles to the gas surface by hauling.

Consequently, the mechanics of this effect only function, if there is a sufficient hauling flow to the surface. In rotating vaporizers, the criteria for a sufficient hauling flow are equivalent to the rate of surface renewal.

Additionally to contact heat, the vaporization rate at high contents of solid matter can be further raised, because due to the enhanced viscosity, the torque per cubic unit of the vaporizer and consequently the rate of mechanical dissipation caused by the rotating shaft increases. In terms of process management, the continuous batching in of a diluted solution in a condensed mass corresponds to a remixing. For this reason, a known patent proposes to vaporize the solution or suspension in a high volume, self cleaning remixed kneader. The kneader here employed consists of plates or plates, or anchors, which are positioned on the shaft, which are equipped with kneading bars, which clean down the casing and the possibly existing second shaft, respectively static elements for the same task of cleaning the shaft for one-shaft kneaders. The rings or anchors divide the produce chamber into mixing zones.

High volume, self cleaning kneaders fulfill the criteria of a high rate of surface renewal and of high hold up. They are designed to withstand and deal with high viscosity and high torque. Another advantage of high volume, self cleaning kneader lies in the fact that, due to an open structure of the transport units, which can carry out transport in flow in the same direction as well as in the opposite direction, a certain remixing rate is guaranteed and an automatic even distribution of the product longitudinally is ensured, also for viscose products. The supply level in the kneader can consequently be regulated via the cog wheel pump, respectively the output exit unit. The remixing required according to above mentioned patent is to be set by the length of the apparatus and the configuration of the kneading elements. This patent describes a similar employment of the high volume, self cleaning kneader for the reaction (polymerization) of products which become viscose with an increasing degree of transformation. The principle of remixing is here advantageously proposed, since the reaction is exothermal and the cold educts are heated to reaction temperature by produce which has already reacted. A potion of the liquid educts vaporizes and, after vaporizing, is mixed back into the kneader, in which instance the preset pressure in the produce chamber controls the evaporation temperature and protects the product from overheating. If the rate of transformation degree increases with the degree of transformation, then remixing is also beneficial. If one of these vaporization products is more volatile than the others, the prescription of the solution is altered by vaporization and the remixing is supposed to counterbalance this effect.

For the evaporation cooling, the same above mentioned criteria are valid, such as a high hold up and surface renewal rate, and are consequently much the same. The proposed remixing also has disadvantages. Since the range of duration periods in the kneader needs to be quite broad, a portion of the produce may remain in the produce chamber for quite a long while. Consequently, inside the vaporizer it needs to be made sure that during this period the produce is not damaged either thermally or chemically. When a changing of the product is carried out, either the kneader needs to be completely emptied and then refilled in a rather time consuming process, or the fresh product is batched according to the existing batch charge and receives rather large amounts of mixed produce from two subsequent product cycles runs. In the case of polymerization, the broad range of duration periods results in a broad distribution of mol masses.

The produce chamber of the kneader can be described as a series of subsequently streamed mixing zones inserted one behind the other. A kneader requires a certain number of mixing zones in order to diffuse the mechanical strain which occurs when the kneading element take effect and to achieve a good mixing effect. However in practical terms, the division of the produce chamber into mixing zones has proven to impair the mixing in a longitudinal direction of the shaft. This feature of the kneading chamber is desired, if the kneader is to exhibit a narrow range of duration periods. In cases where as greata remixing as possible is desired, this feature is unsought for.

The attempt has been made to improve the mixing properties in the longitudinal direction by adaptation of the mixing elements' geometry. However this has had only limited success, since a low viscosity, well mixing product is mixed into a viscose mass. If the mixing is generally improved, both the mixing in of the feed solution and the mixing in a longitudinal direction improve, in which instance the mixing in the longitudinal direction of the viscose mass always remains less beneficial than a mixing in of the feed solution. The range of duration periods can be approximately described as a cascade of mixer-boilers stirred at 100%.

Theoretic considerations as well as practical experiments have demonstrated that the duration period features of the mixer-boiler employed can correspond to a minimum of 3-7 stirred mixer-boilers. Calculations have demonstrated that this number of mixer-boilers is too high for many implementations and in practical terms should lie at 1 to 2 boilers. The practical number of mixer-boilers fluctuates all according to operating mode. These fluctuations lead to undesirable fluctuations in the operating of the kneader.

The drawbacks of the described kneading procedure are, in accordance with the invention, improved in that the feed solution or the re-condensed solution is not fed into the kneader at one spot, but rather via several feed spots.

The distance between the feed spots is subdivided in such a manner that every mixing zone has one feed spot and is sufficiently remixed. In practical terms, 1 to 3 feed spots are required to guarantee that especially during the main vaporization a sufficient remixing is given. The portion of feed for every feed spot is, in accordance with the invention, either fixed or regulated as a function of a parameter which describes the content of solid matter or transformation degree.

The turnovers at the feed spots can in each case be set independently of each other. In this instance the turnover at a feed spot is in each case set or regulated, albeit not obligatorily, in dependence on produce temperature in the vicinity of the respective feed spot. In addition, the pressure in the feed pipes can be set in such a manner that no evaporation in the feed pipes occurs.

The operational mode according with the invention has the advantage that the range of duration periods is more stable and the product undergoes a better exchange. In the case of products with high kneading energy over mass flow, one feed spot in the hind section of the produce chamber is especially advantageous, since the vaporized solvent has a cooling effect and so, the product does not overheat.

In accordance with the invention, the choice of several feed spots has the additional advantage that several remixed working points can be operated. It is thus possible to efficiently operate, in the front section of the vaporizer, a contact heat at 30 to 60% solid matter content with a still relatively low viscosity, which, however, is still sufficient to mechanically destroy foam. In the back section of the apparatus, on the other hand, the solid matter content can be set at 80 to 98%. Thus, the evaporation rate is raised, since both mechanical dissipation and contact heat are utilized.

In addition, the supply level of the kneader can be raised by setting the length over which viscosity is supposed to be lower, by which raising the exiting of output of the kneader is substantially facilitated.

Control of the solid matter content can be, in accordance with the invention, monitored by temperature measurements. The determination of total supply level is aided by the torque of the shaft. In the case of a kneader reactor, the transformation degree can be determined via the extraction of samples over the length of the kneader. These samples also show whether the prescription is correct where several educts are concerned, thus making sure that the vaporized components are replaced in the correct composition.

According to the invention, the prescription can be adapted in the input entrance leading to the feed spot. The vapors are emitted from the vaporizer-kneader or the kneader-reactor either through a helix which transports in a direction opposite to the gas flow, or through a vapor dome. If, nevertheless, foam should form, it is crushed mechanically in the helix or, in accordance with the invention, blown back into the produce chamber along the vessel wall of the vapor dome and simultaneously crushed.

In a further embodiment of the invention, the temperature of the product is to be regulated at the output exit via the revolution number of the mixer-kneader at a given product input. Likewise, the temperature of the product can be regulated by the amount of product input at a given torque, and/or the revolution number of the mixer-kneader by the amount of product input at a given product temperature.

BRIEF DESCRIPTION OF THE DRAWING

Further advantages, characteristics and details of the invention result from the herein following description of a preferred embodiment and from the drawing; in its only FIGURE, said drawing shows an illustration resembling a block circuit diagram of a process structure of plant working in several phases, in accordance with the invention, for the continuous thermal separation of mixed substances, especially for the treatment of polymer solutions.

DETAILED DESCRIPTION

Any chosen polymer solution 1 is fed into a vaporizer 2. Said vaporizer may be, for example, a vaporizer-pipe circuit. In the vaporizer 2, a pre-condensing takes place. The watery polymer solution, in most cases, stems directly from the solvent polymerization and has a polymer content of 5 to 50%, and is, by thermal treatment, condensed up to a concentration approximately 20 to 80%. The vaporized, volatile components (vapors) are extracted from the vaporizer and fed into a condensator 3.

The condensed polymer solution then enters from the vaporizer 2 into a vaporizer-kneader 4. This unit is preferably a horizontal mixer-kneader with one of several horizontally positioned kneader shafts, on which are positioned corresponding kneading elements. To these kneader shafts, a drive 5 is correlated.

The condensed polymer solution can be batched in at one place or several places serially or simultaneously. In this instance, the batching amount of the polymer solution shall be in each case regulated by a preset product temperature.

On the vaporizer-kneader 4, on the other hand, there sits a vapor dome 6 for the emission of the more very volatile components, which, on their part, can be condensed in a condensator 7 and exited.

The polymer solution, which now has been concentrated in the vaporizer-kneader 4 is continuously exited via a polymer output exit 8. In this instance, the polymer solution, which has been exited from the vaporizer-kneader 4, shall, by a build up of pressure, preferably by a cog wheel pump 9, be brought to a pressure of more than 1 bar, preferably to 1 to 10 bar. In the pressurized polymer solution, if required, a watery or gaseous additive is batched in and as homogenously as possible is mixed into the polymer solution in a mixing pipe 10, a static or dynamic mixer. Then, this mixture, in the herein presented embodiment, is relieved, through a nozzle plate 11 into a degassing kneader 12, for degassing, in which instance, by a sudden vaporization of the volatile components and the additives, an increase in particle surface occurs. This occurs in analogy to the so-called popcorn effect.

In the degassing kneader, a stopper flow for the polymer solution occurs, in which instance said mass underlies a steady active surface renewal and dissipation energy is simultaneously absorbed into the polymer solution.

During the degassing, the temperature of the polymer solution inside the degassing kneader is, by adding easily vaporizable additives, which do not dissolve in the polymer solution, at one or more spots in the degassing kneader, held below a temperature at which damage to the polymer solution can occur. This is illustrated by the arrows 13. This whole process is controlled via temperature measurement instruments, through which also the accordingly batched amount of additives for the vaporization cooling is regulated.

On top of the degassing kneader 12, there sits a further vapor dome 14, through which very volatile components are, also in this instance, exited from the degassing kneader.

Adjacent and downstream to the degassing kneader a further polymer output exit 15 is inserted, in which instance the now ready polymer mass, by a further build up of pressure, preferably by a cog wheel pump 16, is brought to a pressure of more than 0 bar, preferably to more than 10 bar.

This polymer mass then enters a cutting device, in which it is preferably granulated or brought to some otherwise desired form. This granulate is then exited.

The invention claimed is:

1. A process for the continuous thermal treatment of mixed substances, comprising:
   dividing the continuous treatment of the mixed substances into a main vaporization stage and a degassing stage, wherein the main vaporization stage and the degassing stage each take place in separate mixer-kneaders.

2. Process according to claim 1, wherein, prior to the main vaporization stage, a pre-condensing of the mixed substance takes place.

3. Process according to claim 2, wherein the pre-condensing of a watery mixed substance with a substance content of 5 to 80% takes place in a vaporizer pipe circuit, until a mixed substance which can be pumped and is more densely concentrated is achieved.

4. Process according to claim 3, wherein the concentrated mixed substance is fed into the main vaporization stage comprising a vaporizer-kneader which is downstream of the vaporizer pipe and is further vaporized until a residual content of volatile components of 2 to 12% is achieved in a condensed product.

5. Process according to claim 4, wherein the concentrated mixed substance is fed into the vaporizer-kneader at a plurality of spots, simultaneously.

6. Process according to claim 5, wherein the condensed product in the vaporizer-kneader is exited via an output exit.

7. Process according to claim 6, wherein the condensed product is exited out of the vaporizer-kneader by a cog wheel pump brought to a pressure of more than 1 bar.

8. Process according to claim 7, including feeding a liquid or gaseous additive into the condensed product.

9. Process according to claim 8, wherein the additive is fed into the condensed product in a mixer comprising one of a mixing pipe, a static and a dynamic mixer, to obtain a homogeneously mixed product.

10. Process according to claim 9, wherein the homogenously mixed product is fed through a nozzle plate and into a degassing kneader inserted downstream of the mixer.

11. Process according to claim 1, wherein vaporized volatile components are extracted via a vapor dome out of each of the separate mixer-kneader and settle in the vapor domes and condensed in a condensator which has been connected via a vapor pipe and thereafter are led out of the closed system.

12. Process according to claim 10, wherein a mixed substance condensed in the degassing kneader is continuously exited via an output exit under pressure, wherein the mixed substance, which is exited from the degassing kneader and freed of volatile components, and is a mass under pressure of more than 1 bar.

13. Process according to claim 12, wherein the mass is formed by a nozzle plate with a cutting device provided downstream of the output exit.

14. Process according to claim 4, including operating continuously the vaporizer-kneader and the degassing kneader at different pressures between 10 to 2,000 mbar, and at temperatures from 60 to 250° C.

15. Process according to claim 1, wherein the mixer-kneaders are operated at different revolution numbers and torques, revolution numbers of 5 to 150 rpm, and torques correlated to the volume of the apparatus of 1 Nm/l to 100 Nm/l.

16. Process according to claim 4, wherein the volatile components of the concentrated mixed substance are almost completely separated, when small amounts of additives are given, which additives are batched in over the length of the mixer-kneader.

17. Process according to claim 14, including choosing a process pressure is the cooling caused by the evaporation of the volatile components prevents overheating.

18. Process according to claim 4, including choosing a heating temperature of the vaporizer-kneader as a maximum temperature of the concentrated mixed substance to avoid damage.

19. Process according to claim 3, including feeding extra substance to the mixer-kneader in a manner that it is distributed over the concentrated mixed substance evenly over the length of the mixer-kneaders.

20. Process for the continuous treatment of polymer solutions in a vaporizer and/or degasser with an uninterrupted produce- and gas chamber, including feeding at least one additive to the polymer solution to regulate the product temperature, so that the temperature always remains below the temperature at which damage to polymer can occur.

21. Process according to claim 20, including feeding the additive into the vaporizer and/or degasser at a plurality of spots wherein a product in the vaporizer and/or degasser is admixed with the additive at several spots.

22. Process for the continuous treatment of polymer solutions in a vaporizer and/or degasser with an uninterrupted produce- and gas chamber, including controlling a supply level of additive so that an efficient surface renewal for the degassing in the vaporizer and/or degasser occurs.

23. Process according to claim 22, wherein, in order to determine the control supply level, a torque of the vaporizer and/or the degasser is utilized and, by choosing the revolution number, the surface renewal and consequently the residual content of solvent is set.

24. Process for the continuous treatment of polymer solutions in a vaporizer and/or degasser with an uninterrupted produce- and gas chamber, including positioning at an output exit of at least one of the mixer-kneaders, a helix shaped output exit unit with at least one shaft and, adjacent to, the helix shaped output exit a cog wheel pump is positioned.

25. Process according to claim 24, including controlling a supply level of one additive relative to a torque of a mixer element by varying the revolution number of the cog wheel pump.

26. Process according to claim 24, wherein a revolution number of the helix shaped output exit unit is set wherein a pre-determined pressure occurs at an input entrance of the cog wheel pump, so that the cog wheel pump is nearly completely filled with product.

27. Process according to claim 24, including controlling a supply level of an additive as a function of torque of a mixer element by varying a revolution number of the helix shaped output exit unit.

28. Process according to claim 27, wherein a revolution number of the cog wheel pump is set so that a predetermined pressure occurs at an input entrance thereto wherein the cog wheel pump is filled with product.

29. Process according to claim 27, wherein the torque of the mixer-element is so set that the supply level relative to the torque is held constant.

30. Process according to claim 24, wherein the helix shaped output exit unit is operated at a revolution number that ensures that a product coming from the mixer-kneader is exited without back pressure.

31. Process according to claim 20, including feeding the additive under such process conditions that it evaporates, thus causing a cooling effect, which sets a product temperature and utilizes the vaporized additive as a hauling gas and for a lowering of the partial pressure, wherein the additive is fed opposite to the flow direction of the product.

32. Process for the continuous treatment of polymer solutions in a vaporizer and/or degasser in an uninterrupted produce- and gas chamber, including supplying an input product of back-fed condensate into a chamber of a mixer-kneader so that the input product is distributed over an entire length of the chamber.

33. Process according to claim 32, wherein contents of the product are determined by measuring a temperature of the content in the mixer-kneader.

34. Process according to claim 32, wherein any foam forming in the chamber is blown back mechanically.

35. Process according to claim 32, wherein feed spots for the input product are positioned so that remixing occurs in the chamber.

36. Process according to claim 32, wherein an amount and the distribution of the input product is so set that the evaporation performance or the transformation rate of the mixer-kneader is maximized.

37. Process according to claim 35, wherein viscosities of the input product at the feed spots are controlled in such a manner that the torque of the mixer-kneader is set for a certain supply level.

38. Process according to claim 35, wherein viscosities of the input product at the feed spots are controlled in such a manner that the torque of the mixer-kneader is set for a certain torque.

39. Process according to claim 35, wherein different input products are fed to the feed spots into the chamber.

40. Process according to claim 15, wherein throughputs of the feed spots are set independently of each other.

41. Process according to claim 40, wherein turnover of the feed spots are set in dependence on the product temperature in the vicinity of the respective feed spot.

42. Process according to claim 41, wherein the pressure in the feed spots are set so that no vaporization occurs in the feed spots.

43. Process for the continuous treatment of a tough-viscose pasty product in a mixer-kneader with an uninterrupted produce- and gas chamber, wherein the temperature of the product at an output exit of the mixer-kneader can be added as a function of the number of revolutions at the product supply to the mixer-kneader.

44. Process for the continuous treatment of a tough-viscose pasty product in a mixer-kneader with an uninterrupted produce- and gas chamber, wherein the temperature of the product in the produce chamber is regulated by the amount of produce supply at a given revolution number.

45. Process for the continuous treatment of a tough-viscose pasty product in a mixer-kneader with an uninterrupted produce- and gas chamber, wherein a revolution number of the mixer-kneader is regulated by the amount of produce supply at a given product temperature in the mixer-kneader.

46. Process for the continuous treatment of a tough-viscose pasty product in a mixer-kneader with an uninterrupted produce- and gas chamber, wherein a temperature of the product in the chamber is regulated by the absolute ambient pressure.

47. Process for the continuous treatment of a tough-viscose pasty product in a mixer-kneader with an uninterrupted produce- and gas chamber, including adding mechanical energy as a function of an amount of produce discharge out of the mixer-kneader, to keep the product temperature in the chamber within a predetermined frame.

48. Process according to claim 47, wherein a technical path of the vapors is at least partially covered with an anti-adhesive coated material.

49. Process according to claim 48, wherein the technical path of the vapors is at least partially cooled.

50. Process according to claim 49, wherein the technical path of the vapors is kept clean with a nozzle and by an alternatively either pulsating or stationary cleaning process.

* * * * *